United States Patent [19]

Cawley

[11] Patent Number: 5,006,939
[45] Date of Patent: Apr. 9, 1991

[54] VIDEO EDITING AND PROCESSING SYSTEM WITH REVERSE VIDEO WITH FORWARD AUDIO REPRODUCTION

[75] Inventor: Robin A. Cawley, Burghclere, Great Britain

[73] Assignee: Quantel Limited, Newbury, United Kingdom

[21] Appl. No.: 426,454

[22] Filed: Oct. 19, 1989

Related U.S. Application Data

[63] Continuation of Ser. No. 27,888, Mar. 19, 1987, abandoned.

[30] Foreign Application Priority Data

Apr. 10, 1986 [GB] United Kingdom ................. 8608775

[51] Int. Cl.[5] ............................................. H04N 5/91
[52] U.S. Cl. .................................. 360/14.1; 358/341; 360/10.1; 360/33.1
[58] Field of Search .................... 360/10.1, 14.1, 19.1, 360/35.1, 64, 33.1; 358/160, 341, 343, 311

[56] References Cited

U.S. PATENT DOCUMENTS

| 3,789,137 | 1/1974 | Newell | 360/10.1 |
| 3,878,560 | 4/1975 | Ramage | 360/10.1 |
| 4,040,098 | 8/1977 | Beeson | 360/10.1 |
| 4,195,317 | 3/1980 | Stratton | 360/10.1 |
| 4,355,332 | 10/1982 | Beeson | 360/14.1 |
| 4,688,106 | 8/1987 | Keller | 360/64 |

Primary Examiner—Aristotelis M. Psitos
Assistant Examiner—W. R. Young
Attorney, Agent, or Firm—Cooper & Dunham

[57] ABSTRACT

A video editing and processing system is so arranged that frames of video signals (1) from a store (3) can be displayed (7) in reverse order while associated audio signals (9) are delivered in normal order, so that the sound is heard in the usual manner.

7 Claims, 1 Drawing Sheet

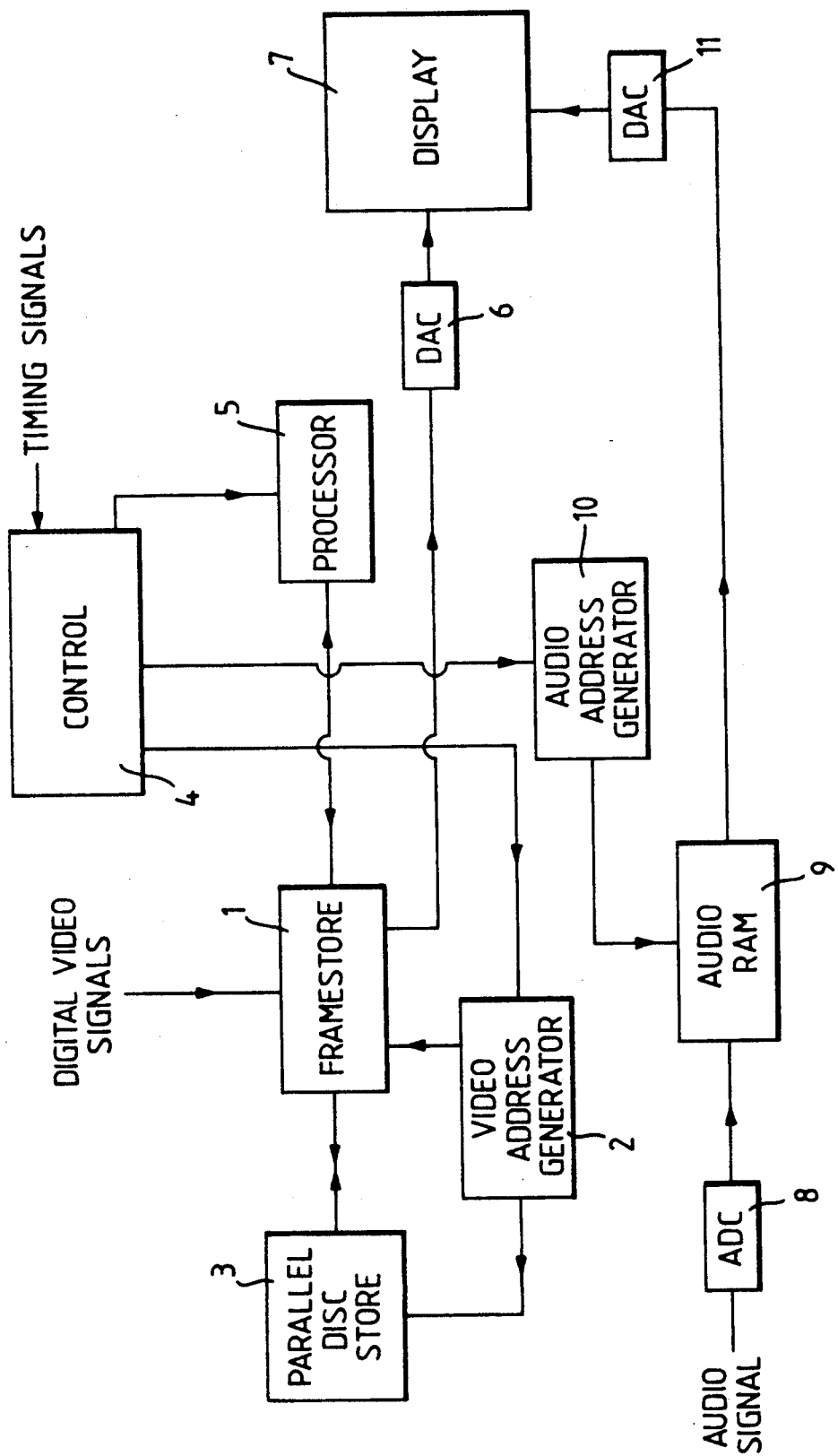

VIDEO EDITING AND PROCESSING SYSTEM WITH REVERSE VIDEO WITH FORWARD AUDIO REPRODUCTION

This is a continuation of application Ser. No. 027,888, filed 03-19-87, now abandoned.

BACKGROUND OF THE INVENTION

This invention relates to improvements in systems for processing and editing sequences of frames of video signals.

When editing video signal sequences the position of the point of editing is often dependent on the timing of the accompanying audio. For example in the case of video accompanied by speech it might be desirable to remove part of the speech in which case the video signals associated with that part of the speech may also have to be removed and the position of the editing would then be dependent on, say, the end of a sentence. Most existing editing systems have the capability of displaying sequences of frames of video signals in both forward or reverse order for example where a video tape is played backwards. In the editing system manufactured by the U.K. company Quantel Limited and identified by the tradename "Harry" the video signals are recorded on parallel transfer discs and the operator controls the reading of the store so that the sequence of frames may be displayed in reverse or usual order at the speed required. A processor is also provided which allows the signals to be processed as required. Using conventional audio techniques in these editing systems the operator is limited because, when the frames are displayed in reverse order, the audio is also played in reverse. This is particularly disadvantageous when speech is accompanying the video as the words will be reversed and it is therefore more difficult to identify the position where an edit is required.

SUMMARY OF THE INVENTION

The object of the invention is to provide a video editing and processing system in which the output of the audio signals is more flexible.

According to the invention there is provided a method of video editing in which frames of video signals are displayed in reverse order and in which at the same time associated audio signals are output in the normal order so that the sound is heard in the usual manner.

Further according to the invention there is provided a video editing system comprising, means for storing a sequence of frames of video signals, random access storage means for storing associated audio signals, video address generator means for providing addresses for the means for storing video signals from which video signals are read to form a display, said address generator means being adapted in one mode to provide addresses so that the frames of video signals are displayed in reverse order, and audio address generator means for generating addresses for the random access storage means from which audio signals are to be output, said audio address means being adapted in one mode to output audio signals in forward order when said video frames are output in reverse order.

Preferably said address generators are operator controlled.

BRIEF DESCRIPTION OF THE DRAWING

One embodiment of the invention will now be described with reference to the accompanying FIG. 1 which illustrates this embodiment.

DESCRIPTION OF THE PREFERRED EMBODIMENT

The system illustrated in FIG. 1 which forms this embodiment receives sequences of video signals and associated audio signals. Frames of digital video signals representing successive pictures in a sequence are input to framestore 1 frame by frame and transferred under the control of video address generator 2 to parallel transfer disc 3 at normal video rate. As described in co-pending UK application number 2156627 U.S. Pat. No. 4,688,106 incoming video signals are split into four eight bit components (i.e. 2 luminance components and 2 chrominance components) and are written in real time into four separate sections of framestore 1 under the control of video address generator 2. The disc stores used in this system can operate in a mode where five heads are operative on each disc, and are connected so that signals can be written in or read from respective tracks on the disc in parallel.

Parallel transfer disc store 3 in this embodiment comprises four of such discs and twenty channels are then provided to transfer data by connecting the five heads of each disc to one of the four sections of the framestore. In this way video signals may be transferred to and from the disc store in real time (i.e. at the normal video rate) although the disc stores may also operate in normal disc mode so that the transfer is much slower.

Once the sequence of video signals for editing is stored on the parallel transfer discs 3 the operator can use control 4 to select frames for editing or display. Video address generator 2 receives command signals from control 4 and in response to these signals generates addresses on the disc store from which signals are to be read. The address generator 2 may address the discs so that frames of video signals are output in sequence either in forward or reverse order at normal video rate or so that one frame may be output for the time required by the operator. Signals output from the parallel disc store can be processed in processor 5 the operation of which is controlled by control 4 to produce effects such as rotating a frame of signals or removing a frame from the sequence. The processor may also co-operate with the framestore to swap the position of frames in the sequence. Address generator 2 also controls the signals output via framestore 1 and DAC 6 to display 7. Signals to be displayed on display 7 must be output from the disc store at normal video rate but for certain types of processing it may be advantageous to read the signals from the disc at less than video rate.

Audio signals associated with the incoming video signals are converted from analogue to digital form in ADC 8 in known manner. The digital sample signals are then written in sequence into audio RAM 9, under the control of audio address generator 10 which receives command signals from control 4. Timing signals are received by control 4 so that the audio signals are in synchronisation with video signals. When a frame of video signals is output to display 7 audio address generator generates the addresses of the signals associated with that frame and these signals are read from the audio ram 9 converted to analogue form in DAC 11 and applied to the audio circuits of display 7. Unlike prior art systems, however, the audio signals may be output in forward order even when the video signals are output in reverse order. When the operator selects the mode of operation where the sequence is reversed the video signals are output in a step wise manner (i.e. frame by frame) but with the order of the frames reversed. The audio signals, however, are output in a continuous sequence with the sample timing being such that one frame of audio signals coincides with the frame of associated video signals. To achieve this timing the control 4 includes a predictor, which when the system is operating in a selected mode, predicts the time to the display of a particular frame, and means for starting the sound replay on the sample at the predicted time ahead of the sound associated with the particular frame.

Considering the case when a sequence of video frames numbered 1-10 has been stored in the parallel transfer disc and associated audio signals in RAM 9 and the operator wishes to output the frames in reverse order. The operator uses control 4 which sends a command signal to video address generator and this provides read addresses frame by frame for store 3 in reverse order i.e. frame 10 first then frame 9 etc. If the operator, however, needs to hear the accompanying audio for, say frame 4, then command signals are applied to the audio address generator 10 which generates read addresses for audio signals. As the frames are displayed in reverse order frame 4 will not appear until after the 6th frame period. The period for which each frame appears on the screen can be determined by the operator. The audio address generates addresses for audio signals for a number of frames of sound, that number generally being selected so that any speech will be intelligible and including the frame of signals relating to the frame of video signals in which the operator is interested. The sound is output by generating the start address of a sequence in response to a command signal at a certain time so that the frame of audio signals of interest are output at the same time as the video signals. This time will obviously be dependent on the period for which the video frames appear. The timing signals provided to control 4 ensure that the required timing is possible.

An alternative method for outputting the audio signals is to output a sequence of signals corresponding to the number which gives the minimum time necessary to produce intelligible speech say ½ second. A frame of video signals will be displayed on the screen for the same period or longer and the sound sequences will include the signals relating to that frame. When the next frame is displayed a similar sequence of audio signals will be output and this sequence will include some signals which were output for the previous frame. This sequence will of course include the audio signals relevant to the new frame.

It is to be understood that neither the means for storing the video signals or the the type of processing applied is limited to that described in this embodiment.

What is claimed is:

1. Apparatus for use in editing a sequence of video frames having an associated audio soundtrack, said apparatus comprising:
   (a) a video signal storing means for storing video signals representative of each of a plurality of video frames, said plurality of video frames constituting said sequence;
   (b) audio signal storing means for storing audio signals constituting said soundtrack, said audio signal storing means storing said audio signals as audio signal frames each corresponding to that portion of the soundtrack that is associated with a respective one of said plurality of video frames; and
   (c) control means for:
      (i) addressing said video signal storing means to determine the output of video signals therefrom, said control means enabling video signals representative of said video frames to be output in reverse order to the order of said sequence, and
      (ii) addressing said audio signal storing means to determine the output of audio signal frames therefrom in the order of said sequence, said control means furthermore enabling any selected audio signal frame to be output at the same time as its corresponding video frame is output in a verse order sequence of video frames; the apparatus thereby facilitating identification fthe position where an edit is required by enabling a reverse video frame-forward audio frame sequence to be output in which a selected frame of audio signals coincides in time with its corresponding video frame.

2. Apparatus as claimed in claim 1, which said control means is further arranged to enable a selected soundtrack sequence of audio frames to be output, said selected soundtrack sequence being of sufficient length to produce intelligible speech, and at the same time to enable a selected video frame corresponding to an audio frame in said selected soundtrack sequence to be output for at least the same duration as said selected soundtrack sequence is output.

3. Apparatus as claimed in claim 1, in which said control means comprises video address generator means for providing addresses to said video signal storing means to cause selected video signal frames to be output therefrom, and audio address generator means for providing addresses to said audio signal storing means to cause selected audio signal frames to be output therefrom.

4. An apparatus as claimed in claim 1, further comprising display means, and wherein said video frames are output for display on said display means.

5. A method of editing a sequence of video frames having an associated audio soundtrack in order to facilitate selection of an editing point in the sequence of video frames as determined by the audio content of the audio soundtrack, the method comprising the steps of:
   (a) storing video signals representative of each of a plurality of video frames constituting said sequence in a video signal storing means;
   (b) storing audio signals constituting said soundtrack in an audio signal storing means, said signals being stored as audio signal frames each corresponding to that portion of the soundtrack that is associated with a respective one of said plurality o video frames;
   (c) addressing said video signals storing means to determine the output of video signals therefrom, said addressing being arranged to enable video signals representative of said video frames to be output in verse order to the order of said sequence;
   (d) addressing said audio signal storing means to determine the output of audio signal frames therefrom in the order of said sequence; and
   (e) selecting an audio frame for output at the same time as its corresponding video frame is output in a reverse order sequence of video frames.

6. A method as claimed in claim 5, further comprising the steps of:
- selecting a soundtrack sequence of audio frames of sufficient duration to produce intelligible speech; and
- selecting a video frame corresponding to an audio frame in said selected soundtrack sequence for output for at least the time it takes to output said selected soundtrack sequence.

7. A method as claimed in claim 5, further comprising the step of outputting selected video frames for display on a display means.

* * * * *